(12) United States Patent
Pekny et al.

(10) Patent No.: US 8,549,246 B2
(45) Date of Patent: Oct. 1, 2013

(54) SPI NAND PROTECTED MODE ENTRY METHODOLOGY

(75) Inventors: Theodore T. Pekny, Sunnyvale, CA (US); Samuel A. Shapero, San Jose, CA (US); Kirubakaran Periyannan, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 1554 days.

(21) Appl. No.: 12/112,880

(22) Filed: Apr. 30, 2008

(65) Prior Publication Data

US 2009/0276561 A1 Nov. 5, 2009

(51) Int. Cl.
*G06F 12/00* (2006.01)

(52) U.S. Cl.
USPC .................................. 711/163; 711/E12.036

(58) Field of Classification Search
USPC .......................................................... 711/163
See application file for complete search history.

(56) References Cited

U.S. PATENT DOCUMENTS

| 2006/0236204 | A1 | 10/2006 | Lee et al. | |
| 2006/0277337 | A1* | 12/2006 | Chuang et al. | 710/62 |
| 2007/0115743 | A1 | 5/2007 | Sartori et al. | |
| 2007/0240182 | A1* | 10/2007 | Callahan | 725/30 |

OTHER PUBLICATIONS

U.S. Appl. No. 11/873,805, filed Oct. 17, 2007, Pekny et al.
U.S. Appl. No. 11/873,816, filed Oct. 17, 2007, Pekny et al.
U.S. Appl. No. 11/873,826, filed Oct. 17, 2007, Pekny et al.
U.S. Appl. No. 11/873,833, filed Oct. 17, 2007, Pekny et al.
Micron Technical Note, TN-28-01, Boot Block Flash Memory Technology, FT01 p. 65—Rev. Dec. 1999.
Micron Technical Note, TN-28-02, Bulk Erase to Boot Block Conversion, FT02 p. 65—Rev. Dec. 1999.
Micron Flash Memory, MT28F008B3, MT28F800B3, 3v Only, Dual Supply (Smart 3), Q10.fm—Rev. E Jun. 2004 EN.
Micron Technical Note, NAND Flash Security, TN-2911_nand_security.fm—Rev. B May 2007 EN, http://download.micron.com/pdf/technotes/nand/tn2911.pdf.
TMS 320x28xx, 28xxx DSP Serial Peripheral, Interface (SPI) Reference Guide, Literature No. SPRU059D, Jun. 2002—Revised Nov. 2006.
Micron NAND Flash Memory, MT29F4G08AAA, MT29F4G08BAA, MT29F4G08DAA, MT29F16G08FAA, 4gb_nand_m4oa_1.fm—Rev. B Feb. 2007 EN.
Open NAND Flash Interface Specification, Revision 1.0, Dec. 28, 2006.

* cited by examiner

*Primary Examiner* — Reginald Bragdon
*Assistant Examiner* — Hamdy S Ahmed
(74) *Attorney, Agent, or Firm* — Fletcher Yoder

(57) ABSTRACT

One or more techniques are provided for restricting access to protected modes of operation in a memory device. In one embodiment, detection circuitry is provided and configured to receive and evaluate a protected mode entry sequence for accessing a protected mode of operation. The detection circuitry may be further configured to temporarily enable an output pin on a serial interface between the memory device and a master device to receive inputs, such that a entry sequence may be entered on both the input and output pins. In another embodiment, the detection circuitry may be enabled only if a security code is first provided, thus requiring both the correct security code and entry sequence before protected mode access is allowed. The memory device may also include a parallel NAND memory array, and detection logic may be further configured to enable a serial-to-parallel NAND translator once protected mode access is allowed.

25 Claims, 7 Drawing Sheets

SPI NAND PROTECTED MODE ENTRY METHODOLOGY

BACKGROUND

1. Field of the Invention

Embodiments of the invention relate generally to the field of memory devices and more particularly, to techniques for accessing one or more protected modes of operation in serial peripheral interface-based NAND memory devices.

2. Description of the Related Art

A serial peripheral interface (SPI) is a communication interface standard that provides a synchronous serial data link between a master device and a slave device. For instance, an SPI interface may provide support for a low to medium bandwidth network connection amongst processors and other devices.

An SPI bus includes four wires including two control lines and two data lines. The two control lines include a Serial Clock (SCLK) line and a Chip Select (CS) line. The SCLK signal is used to clock the shifting of serial data simultaneously into and out of the master and slave devices, thereby allowing the SPI architecture to operate as a full duplex protocol. The CS line is driven with a signal that enables or disables the slave device being controlled by the master device. It is also possible for the master device to communicate with multiple slave devices, although each additional slave device may require an additional CS line.

The two data lines of the SPI bus include a Serial Data Out (SOUT) line and a Serial Data In (SIN) line. The SOUT line is a data communication line that is generally configured to transfer data from an output of the slave device to an input of the master device. Accordingly, in the unlikely scenario that a user attempts to drive input data on the SOUT line, the data is ignored by the device. Similarly, the SIN line is a data communication line configured to transfer data from the output of the master device to the input of the slave device. Typically, the SOUT and SIN lines are active when the CS signal received by the slave device transitions to an enabling state, such as active low or active high.

Because SPI utilizes only four lines of communication, SPI has become increasingly advantageous for use in systems and applications desiring compact and simple integrated circuit designs. Particularly, the SPI interface's relatively simple configuration of control and data lines allows for a relatively high board density at a low cost. For instance, the implementation of an SPI interface in a NAND-based flash memory may allow for integrated circuit designs having as few as 8 pins, whereas conventional devices may require 32 or more pins. Thus, SPI is ideal for providing a simple and easily compatible interface to more complex circuits, such a parallel NAND memory device.

Electronic devices, such as memory devices, are typically manufactured to include one or more "protected modes" of operation. These protected modes of operation may include access to certain features, commands, or registers in the device which are generally inaccessible in a "normal mode," such as that which is typically available to an end-user consumer. For instance, a protected mode of operation may include a debug mode allowing authorized service technicians to determine a root cause of failure in the event of a defective device. Protected modes may also include a programming mode for setting various electronic trimmers and regulators on the device in accordance with a customer's design specifications, and a testing or evaluation mode for benchmarking or stress testing a device to determine the limits of its performance.

Although specific examples have been provided herein, it should be understood that a protected mode may be any mode of operation other than a normal mode. Further, because the aforementioned protected modes may include access to certain protected commands or registers capable of altering sensitive data or parameters of a device, such as firmware, trimmers, or regulators, improper tampering with protected mode functions, whether intentional or accidental, may result in undesirable performance or even damage to a device. Thus, it is often necessary to restrict access to protected modes to only authorized users, such as service technicians, engineers, designers, and so forth. Typically, this has been accomplished by requiring a protected mode entry sequence to be entered on a device, for example, on an input pin. The entry sequence may essentially include a plurality of commands which must be entered in a specific order so that protected mode access is permitted. However, without additional security or protective measures, the possibly exists that the protected mode entry sequence may be accidentally entered through software data entries occurring during a normal mode operation. The possibility also exists that an unauthorized user having gained knowledge of the entry sequence may access to the protected modes. Thus, current methods may not fully protect a device against accidental or intentional access to protected modes of operation by unauthorized users.

Embodiments of the present invention may be directed towards one or more of the problems set forth above.

DETAILED DESCRIPTION OF SPECIFIC EMBODIMENTS

As discussed in further detail below, embodiments of the present invention provide techniques which may be implemented on various electronic devices to provide increased security for controlling access to one or more protected modes of operation in a device. In one embodiment, a device requires a protected mode entry sequence to be entered on both input and output pins of the device. In normal operation, an input on an output pin is generally regarded as an illegal operation, and is thus ignored by the device. Accordingly, certain embodiments of the present invention provide a mechanism for temporarily enabling a device to accept inputs on an output pin. Additional embodiments of the present invention may provide for a further mechanism in which an entry sequence is disregarded or ignored by a device unless a security code is first provided, or a specific command is first executed. These and other features, aspects, and advantages of embodiments of the present invention will be discussed in further detail with regard to the following description of various embodiments of the present invention.

Figure 1:
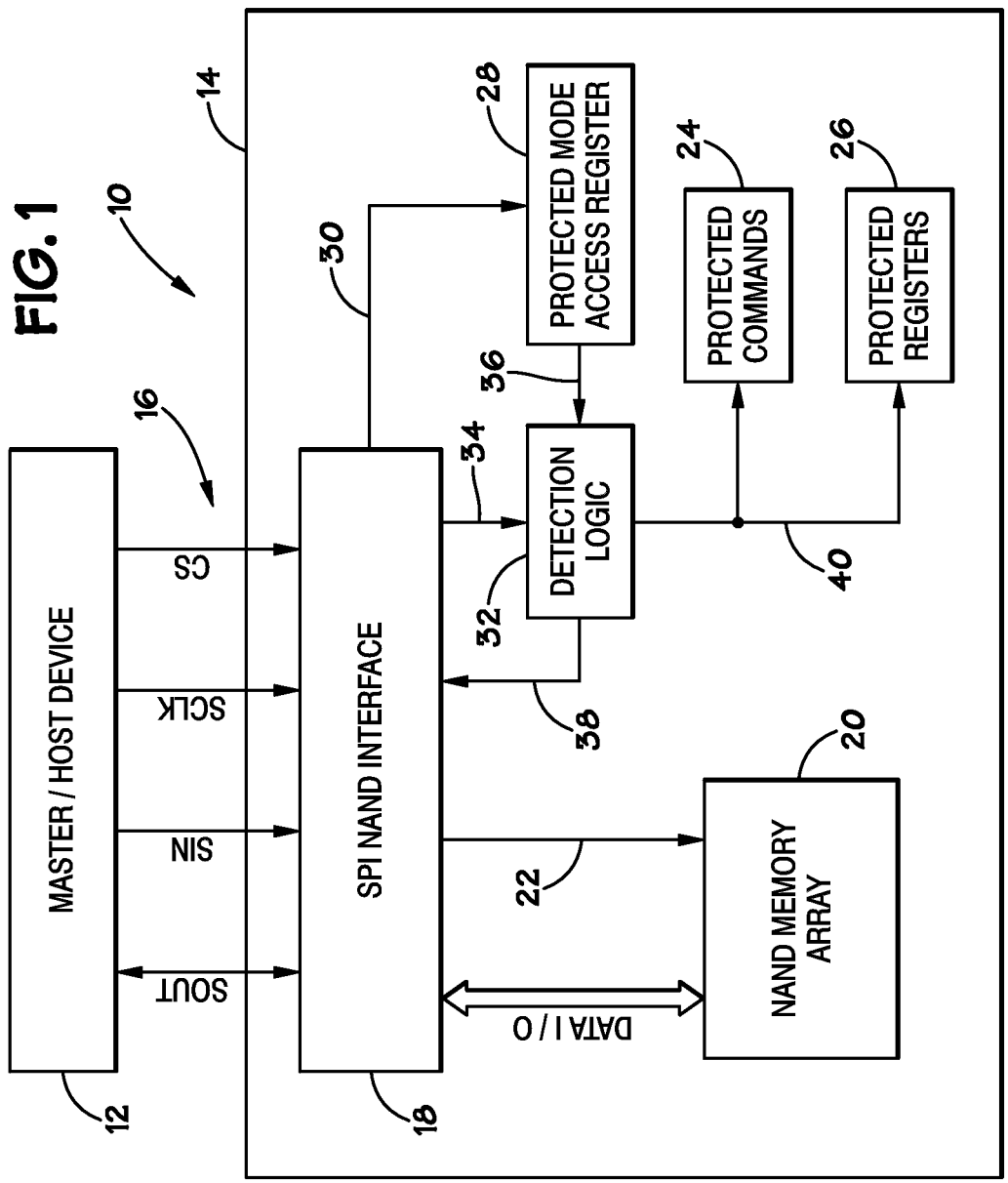
FIG. 1 is a block diagram illustrating a memory system including an SPI NAND memory device in accordance with an embodiment of the present invention.

Turning now to the drawings and referring initially to FIG. 1, a block diagram depicting a memory system, designated generally by reference numeral 10, is illustrated in accordance with an embodiment of the present invention. The memory system 10 may be adapted for use in a variety of applications, such as a computer, pager, cellular phone, digital camera, digital audio player, or the like. The memory system 10 may include a master device 12 communicatively coupled to a slave device 14. For example, the master device 12, in certain embodiments, may include a computer having programmed control circuitry, such as a microcontroller, general purpose microprocessor, or application specific microprocessor (ASIC). The slave device 14 may include one or more peripheral devices. In the presently illustrated embodiment, the slave device 14 is a NAND memory device. Further, while additional slave devices may be interfaced with and controlled by the master device 12, for purposes of simplicity, only one slave device 14 is illustrated in FIG. 1.

The master device 12 may be communicatively coupled to the slave device 14 via one or more transmission lines. In accordance with the embodiment shown in FIG. 1, the master device 12 and the slave device 14 are configured to communicate through a serial peripheral interface (SPI) via an SPI bus, designated generally by reference numeral 16. The SPI interface provides a synchronous serial data link capable of operating in full duplex mode (e.g., allows for simultaneous transmission of input and output signals). During typical operation, devices (e.g., master device 12 and slave device 14) on the SPI bus 16 typically operate in master/slave mode, thus enabling the master device 12 to initiate the transmission of data frames to the slave device 14. Further, although not explicitly illustrated in FIG. 1, the master device 12 and slave device 14 may also include various shift registers configured to facilitate the exchanging and storing of data.

The presently illustrated SPI bus 16 provides four separate communication lines, including two data lines and two control lines. The data lines of the SPI bus 16 include a Serial Data In (SIN) line and a Serial Data Out (SOUT) line. The SIN line is a data communication line that is generally configured to carry data from the output of the master device 12 to the input of the slave device 14. Similarly, the SOUT line is a data communication line which is generally configured to carry data from the output of the slave device 14 to the input of the master device 12.

The control lines of the SPI bus 16 include a Serial Clock (SCLK) line and a Chip Select (CS) line. The SCLK line provides a clock signal from the master device 12 to the slave device 14. The SCLK signal is typically driven using a digital clock signal, which may be provided by a crystal oscillator, for example, to regulate the flow of data bits between the devices. For example, data may be latched or written on either a rising edge or falling edge of the SCLK signal. The CS line is driven with a signal that enables or disables the slave device 14 being controlled by the master device 12. In one embodiment, the CS line may be configured as active low, although alternative implementations may similarly provide an active high CS signal scheme. Under an active low CS configuration, the master device 12 may enable and communicate with the slave device 14 by driving a logical low signal on the CS line.

Further, as discussed above, certain embodiments of the memory system 10 may include multiple slave devices 14. Under such configurations, a single SCLK, SIN, and SOUT line may be shared by the plurality of slave devices 14 and the master device 12. However, each additional slave device 14 connected to the master device 12 may include its own CS lines. Thus, in the case of multiple slave devices 14, the master device 12 may drive a particular CS line (from a plurality of CS lines) in order to enable a corresponding slave device 14 for sending and receiving data via the SIN and SOUT lines, regulated by the SCLK signal.

As discussed above, the slave device 14, in the presently illustrated embodiment of the memory system 10 of FIG. 1, may be a NAND memory device. The NAND memory device 14 may include an SPI NAND interface 18 coupled to the SPI bus and configured for receiving the SIN, SCLK, and CS signals. Under normal operating conditions, the control lines CS and SCLK and the data line SIN transmit signals from the master device 12, through the SPI bus, and to the SPI NAND interface 18 in the NAND memory device 14. The SPI NAND interface 18 is essentially a controller that is configured to receive and transmit data via the SPI bus 16. For example, data transmitted by the master device 12 across the SPI bus 16 is received by the inputs of the SPI NAND controller 18. Similarly, the SPI NAND interface 18 may also transmit data from the NAND memory device 14 to the master device 12 via the SOUT line.

Under normal operating conditions, the SOUT data line is generally not configured to permit a bidirectional transfer of data (e.g., outputs and inputs) to and from the SPI NAND interface 18. For instance, an attempt to input data from the master device 12 to the NAND memory device 14 on the SOUT line may be interpreted as an illegal operation that is ignored by the SPI NAND interface 18. However, as will be described in further detail below, embodiments of the present invention may provide a mechanism, under certain circumstances, which may permit the SPI NAND interface 18 to accept an input from the master device 12 on the SOUT line. This is illustrated on the SPI bus 16 by the additional input arrow on the end of the SOUT data line coupled to the SPI NAND interface 18.

The SPI NAND interface 18 may also transmit data to and receive data from the NAND memory array 20 by way of the data input/output (DTIO) line, as well as the access control line 22. For instance, the access control line 22 may enable the transfer of data from or to the NAND memory array 20 only when the master device 12 drives the CS line low, as discussed above. Thus, when access is enabled via the control line 22, the DTIO line allows for communication between the NAND memory array 20 and the SPI NAND interface 18.

During operation of the memory system 10, the SPI NAND interface 18 receives data transmitted via the SPI bus 16 and synchronizes the flow of data (e.g., DTIO) and control signals between the various components of the NAND memory device 14. For example, the SPI NAND interface 16 receives data and commands from the master device 12 in a serialized format via the SIN data line and parses the incoming serialized signal for the data and the commands. As will be appreciated by those of ordinary skill in the art, the SPI NAND controller 106 may include shift registers (not shown) to provide for appropriate timing of the signals transmitted and received by the SPI NAND interface 16.

The SPI NAND interface 18 may further include one or more caches for buffering data, as well as algorithms that are run onboard to interpret incoming signals to determine specific commands, addresses, data, and the like. These algorithms may also include routines to determine the appropriate outputs of the SPI NAND interface 16, including, for example, address schemes, error corrections, and movements of data within the NAND memory array 20. For instance, in one embodiment, the SPI NAND interface 18 may be configured to translate signals sent to the NAND memory array 20 into standard serial NAND format signals, such as command latch enable (CLE), address latch enable (ALE), write enable (WE), and read enable (RE) signals. In further embodiments, the SPI NAND interface 18 may be configured to translate signals sent to the NAND memory array 20 into non-standard signal formats, which may include, in one embodiment, a set of hexadecimal command codes.

As discussed above, the NAND memory device 14, in accordance with embodiments of the present invention, may include one or more protected modes of operation (e.g., testing, debugging, evaluation, programming, etc.). In these protected modes of operation, an operator may be able to access certain command sets and register sets which are typically inaccessible during normal modes of operation, such as those designated for consumer/end-user use. These protected command sets and register sets are depicted by reference numerals 24 and 26, respectively. The protected commands 24 and protected registers 26 may enable an operator to debug certain portions of a defective memory device 14, to program or set various trimmers or circuit regulator values for the device 14 in accordance with customer specifications, or to perform benchmarking or evaluation procedures, for example. As discussed above, it is often necessary to employ security measures to restrict access to the protected commands 24 and registers 26 to only authorized operators (e.g., manufacturers, service technicians, etc.). For example, improper tampering with protected mode functions, whether intentional or accidental, may cause damage to the NAND memory device 14, and may render the device 14 inoperable. In order to provide the aforementioned security features, the NAND memory device 14 of the presently illustrated embodiment includes a protected mode access register 28 and detection logic circuitry 32 coupled to the SPI NAND interface 18 via communication lines 30 and 34, respectively. As will be explained in detail below, the protected mode access register 28 and the detection logic 32 collectively provide multiple layers of security access protocols to prevent unauthorized access to the protected commands 24 and protected registers 26.

In the presently illustrated embodiment, the protected mode access register 28 is essentially a hidden register in the NAND memory device 14 which may receive and store a security code (e.g., password, access code, P.I.N., etc.) for enabling the detection logic 32 to receive and detect a protected mode entry sequence. By way of example, the presence and address of the protected mode access register 28 may be intentionally omitted from associated product specification documentation provided to end-user customers. Thus, data may only be written to the protected mode access register 28 if the address of the protected mode access register 28 is known. This provides a first layer of security for accessing a protected mode in the NAND memory device 14. That is, only users who are aware of or have knowledge of the protected mode access register 28 may be able to overcome this first layer of security. Additionally, while the presently illustrated protected mode access register 28 is described herein as a single register, alternate embodiments of the present invention may include a plurality of protected mode access registers to provide an even greater level of security.

If the address of the protected mode access register 28 is known, the user may attempt to write the security code value to the protected mode access register 28. For instance, the user may, through the master device 12, write the security code value to the protected mode access register 28 via the SIN data line of the SPI bus 16. The length of the security code (e.g., number of bits) may depend on the size of the register 28. For instance, the protected mode access register 28 may be an 8-bit register. It should be understood, however, that registers utilizing more bits (e.g., 16-bit, 24-bit) may also be utilized depending on the level of security desired.

Further, only a correct security code entry by the user into the protected mode access register 28 will enable the detection logic 32. For example, the value written to the register may be compared with a preset value stored in the detection logic circuit 32, for example, by way of communication line 36. Though not explicitly illustrated, this preset value may be stored in a register, EEPROM, or other read-only memory within the detection logic 32. If the security code value written to the protected mode register 28 by the user matches the preset value, only then may the detection logic 32 be enabled. Enabling the detection logic 32 may be accomplished, for instance, by sending a protected mode entry enable signal (PME_EN signal) to the detection logic 32 which may, for example, set an enable bit within the detection logic 32. This effectively provides a second level of security for accessing protected modes of operation in the NAND memory device 14. That is, a user may only enable the detection logic if a correct security code is written to the protected mode access register 28.

Referring briefly back to the above-discussed prior art techniques for accessing protected modes of operations, existing techniques generally rely on a user entering a specific entry sequence to a device via a designated input pin (e.g., SIN). An entry sequence typically consists of a plurality of commands that must be entered in a specific order before access to protected modes of operation is allowed. For example, prior art techniques are known to employ entry sequences that may include as many as 16 commands. Invariably, this increases the complexity of the detection circuitry needed to decode and process the inputs to detect the entry sequence. Moreover, as discussed above, known entry sequence detection techniques are implemented independently and without additional security measures, such as the above-described protected mode access register 28 of the presently illustrated embodiment. Thus, the possibility exists that an unauthorized user may gain entry to a protected operation mode of a device by accidentally or intentionally entering the correct entry command sequence. Further, in the case of the accidental command sequence entry, the unauthorized user may be unaware that a protected mode has been entered. Thus, the unauthorized user may inadvertently, through subsequent command entries, alter protected portions (e.g., protected commands 24, protected registers 26) of a device which may cause damage to or affect device performance negatively.

The detection logic 32 of the presently illustrated embodiment provides several advantages over the above discussed prior art techniques in order to protect a device, such as the NAND memory device 14, against unauthorized accidental or intentional entry into protected modes. First, as discussed above, the detection logic 32 may only be enabled if a correct security code value is written to the protected mode register 28. Further, the detection logic 32 of the presently illustrated embodiment may be configured to detect an input entry sequence on both the SIN and SOUT data lines of the SPI bus 16. As discussed above, under normal operations, an input on the SOUT data line is typically interpreted as an illegal operation and thus, any input data transmitted on the SOUT data line may be ignored by the SPI NAND interface 18. The detection logic 32 of the presently illustrated embodiment provides a mechanism that may temporarily enable the SPI interface 18 to recognize and accept inputs on the SOUT data line in addition to the SIN data line of the SPI bus 16. Further, although the detection logic 32 and the SPI NAND interface 18 is illustrated in FIG. 1 as separate components, in alternate embodiments, the detection logic 32 may integrated into the SPI NAND interface 18.

In accordance with one embodiment of the present invention, a protected mode entry sequence may include an entry sequence which alternates or toggles between receiving inputs on SIN and SOUT. For instance, upon the enabling the detection logic 32 (e.g., via correctly setting the protected mode register 28), the first entry of the protected mode entry sequence may be a specific command byte received on SIN. The entered commands are then sent to the detection logic 32 via data line 34 for evaluation. As will be appreciated by those skilled in the art, the detection logic 32 may include a plurality of registers, latches, and flip flops for decoding and processing the entered commands to evaluate whether each entry of an entered sequence is correct. If the user enters the first entry on SIN correctly, the detection logic 32 may be configured to send an SOUT input enable signal (SOUT_IN_ON) via the control line 38. Accordingly, the SOUT_IN_ON signal instructs the SPI NAND interface 18 to except and to accept a second entry on the SOUT pin, for example, by setting a switch and/or an enable bit. Upon receiving the second entry, the detection logic 32 may instruct the SPI NAND interface 18 to revert to its normal configuration (e.g., ignore inputs on SOUT) by sending an SOUT input disable signal (SOUT_IN_OFF). Accordingly, subsequent entries required on the SOUT pin may depend on first providing a correct entry on the SIN pin to reassert the SOUT_IN_ON signal. For instance, a third entry and fourth entry on SIN and SOUT, respectively, may be repeated in the manner described above.

Additionally, if at any point during the attempted entry sequence, the user provides an incorrect entry, the detection logic may temporarily lock protected mode access, such that access to the protected commands 24 and protected registers 26 is completely restricted. Thus, any subsequent entries by the user, even if correctly entered, are disregarded by the SPI NAND interface 18 of the NAND memory device 14. For instance, upon detecting an incorrect entry at any point during the entry sequence, the detection logic 32 may include a lockout bit (PME_LOCK) that may be set to override the security access protocols. (e.g., device 14 remains locked regardless of properly provided authentication). That is, even a subsequent correctly entered protected mode entry sequence by a user will not grant the user access to the protected commands 24 or protected registers 26. This effectively provides a third level of security for restricting access to the protected commands 24 and protected registers 26 of the NAND memory device 14. In order to "reset" the security access protocols and re-initialize PME_LOCK, the NAND memory device 14 may have to be power cycled off and back on. However, this may require the user to start over from the beginning of the security access procedure, beginning with the writing of the security code to the protected mode access register 28.

If the user enters the entire protected mode entry sequence correctly on the SIN and SOUT pins, only then is access to the protected modes of operation in the NAND memory device 14 permitted. For instance, if the detection logic 32 detects that the correct sequence has been entered, only then may access to the protected commands 24 and protected registers 26 be enabled via access control lines 40. Thus, in summary, the memory system 10 presently illustrated in FIG. 1 provides the following layers or security measures for accessing one or more protected modes of the NAND memory device 14:

(1) a user must known the address of the protected mode access register or registers 28;

(2) a user must write a correct security code value to the protected mode access register to enable the detection logic 32; and (3) upon enabling the detection logic 32, a user must enter a correct sequence of commands and/or data in order to access the protected commands 24 and protected registers 26.

Thus, the presently discussed techniques illustrate a clear advantage over the prior art by providing the ability to utilize a highly secure protected mode entry sequence that cannot be easily entered, either accidentally or intentionally. For instance, by requiring the entry sequence to be entered on both the SIN and SOUT pins of the SPI bus 16, the presently illustrated embodiment increases protection against the accidental reproduction of the entry sequence via random software data entries. Moreover, the highly secure and difficult-to-reproduce nature of the protected mode entry sequence techniques in presently disclosed embodiments allows for shorter overall entry sequences to be used while maintaining a high level of protection. For instance, as discussed above, entry sequences in prior art techniques may utilize as many as 16 entries. On the other hand, embodiments of the present invention may exceed the level of protected mode access security provided by the prior techniques by utilizing as little as 4 entries (e.g., first entry on SIN, second entry on SOUT, third entry on SIN, fourth entry on SOUT). Advantageously, the reduced entry sequence decreases the number of device components (e.g., latches, registers, flip-flops) required in implementing the detection logic 32. Thus, in addition to providing increased protected mode access security, embodiments of the present invention may also reduce the design complexity of the detection logic 32, which may further reduce overall design and production costs associated with manufacturing the NAND memory device 14.

Although the foregoing techniques have been described with reference to a NAND memory device 14 in FIG. 1, one skilled in the art will recognize the applicability of these techniques to a variety of applications. For example, the protected mode entry techniques described herein may be applied to devices based on NOR memory, EEPROMs, programmable gate arrays (PGAs) or the like. Further, while the embodiment of the memory system 10 illustrated in FIG. 1 has been discussed primarily with reference to a serial interface NAND memory device 14, the benefits of the presently described techniques may also be implemented in context of parallel interface NAND memory devices. For instance, referring now to FIG. 2, an alternate embodiment of the NAND memory device 14 of FIG. 1 is illustrated. To facilitate a clearer discussion, blocks which perform essentially the same function in FIG. 2 as those blocks in FIG. 1 have been numbered with like reference numerals.

Figure 2:
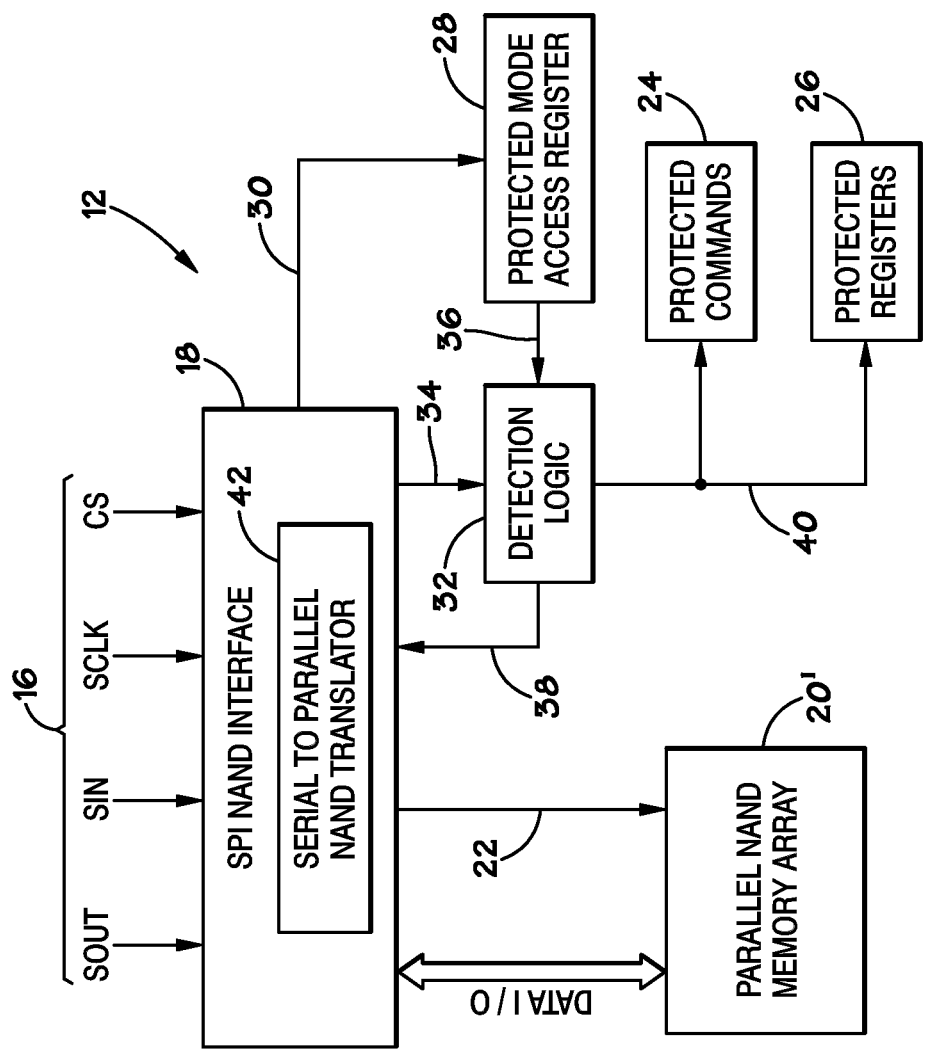
FIG. 2 is a block diagram that illustrates a SPI NAND memory device including a parallel interface NAND memory array in accordance with an alternative embodiment of the memory system of FIG. 1.

As illustrated in FIG. 2, the NAND memory device 14 in FIG. 2 includes a parallel interface NAND memory array, designated by the reference numeral 20'. Additionally, the SPI NAND interface 18 is illustrated in FIG. 2 as further including serial-to-parallel NAND translator logic 42. The serial-to-parallel NAND translator logic 42 may be configured to translate serial commands provided to the NAND memory device 14 through the SPI bus 16 into parallel commands recognizable by the parallel interface NAND memory array 20'.

The security access protocols (e.g., protected mode access register 28, detection logic 32) operate in a substantially identical manner as described in FIG. 1, except that the detection logic 32 may be further configured to initiate and enable the serial-to-parallel NAND translator 42 once a correct protected mode entry sequence is detected. For instance, like the embodiment depicted in FIG. 1, a user may write a security code value to the protected access register 28 and, if the written value is correct, the detection logic 32 will be enabled to provide for detection of the protected mode entry sequence on both the SIN and SOUT pins. Accordingly, if a correct sequence is entered, access to the protected commands 24 and protected registers 26 may be enabled by access control lines 40. Thereafter, the detection logic 32 may further transmit a serial-to-parallel NAND translator enable signal (SPT_EN) via control line 38 to enable the serial-to-parallel NAND translator logic 42. As discussed, the serial-to-parallel NAND translator logic 42 translates serial commands received at the SPI NAND interface 18 through the SPI bus 16 into a parallel NAND format compatible with the parallel interface NAND array 20'. Thus, a user who has successfully gained access to a protected mode may be able to execute protected commands, write to protected registers, and send data to or receive data from the parallel interface NAND array 20'.

Before proceeding with the discussion of the remaining figures, it should be noted that although an implementation including both the above-described protected mode access register 28 and the detection logic 32 of FIGS. 1 and 2 operating in conjunction with one another will likely provide the highest level of security, it is understood that such implementations may not always align with business constraints (e.g., production and developmental costs). Thus, it is possible that certain embodiments of the present invention may implement only one or the other of these aforementioned features. For example, in one embodiment, the memory system 10 may utilize only a detection logic unit 32 for restricting access to the protected commands 24 and protected registers 26. In this embodiment, the detection logic 32 functions as described above with reference to FIGS. 1 and 2, with the exception of not requiring that a user first writes a correct security value to a protected mode access register 28. That is, the detection logic 32 may initially be enabled, allowing a user to enter the protected mode entry sequence on the SIN and SOUT pins without first providing a security code.

Further embodiments utilizing only the detection logic 32 may, however, incorporate additional security measures even without use of the above-described protected mode access register 28. For instance, rather than configuring the detection logic 32 to be initially enabled, the detection logic 32 may be disabled initially, and enabled only upon receiving a detection logic enable command from a user. Like the protected mode access register 28, this detection enable command may be intentionally omitted from product specification documentation provided to end-user customers, thereby limiting the knowledge of the detection logic enable command to only operators authorized to access the protected modes. Accordingly, only a user having knowledge of the command may enable detection logic 32 to begin detecting a protected mode entry sequence. Users without knowledge of the detection logic enable command would not be able to enter the protected mode entry sequence, even if they have knowledge of the entry sequence itself, as all entries are effectively ignored while the detection logic 32 remains in a disabled state.

Conversely, the memory system 10, in accordance with additional embodiments, may utilize only the protected mode access register 28 without the detection logic 32. In this embodiment, a user is essentially required to write a correct security code value to the register in order to access the protected commands 24 and protected registers 26. However, as discussed above, the protected mode access register 28 is intentionally hidden. Thus, a user would be required to have knowledge of the existence of the register 28, the address of the register 28, as well as the security code. Accordingly, only upon entering the correct security code into the protected mode access register 28 will a user be permitted to access the protected mode. The latter embodiment is illustrated in FIG. 3.

Figure 3:
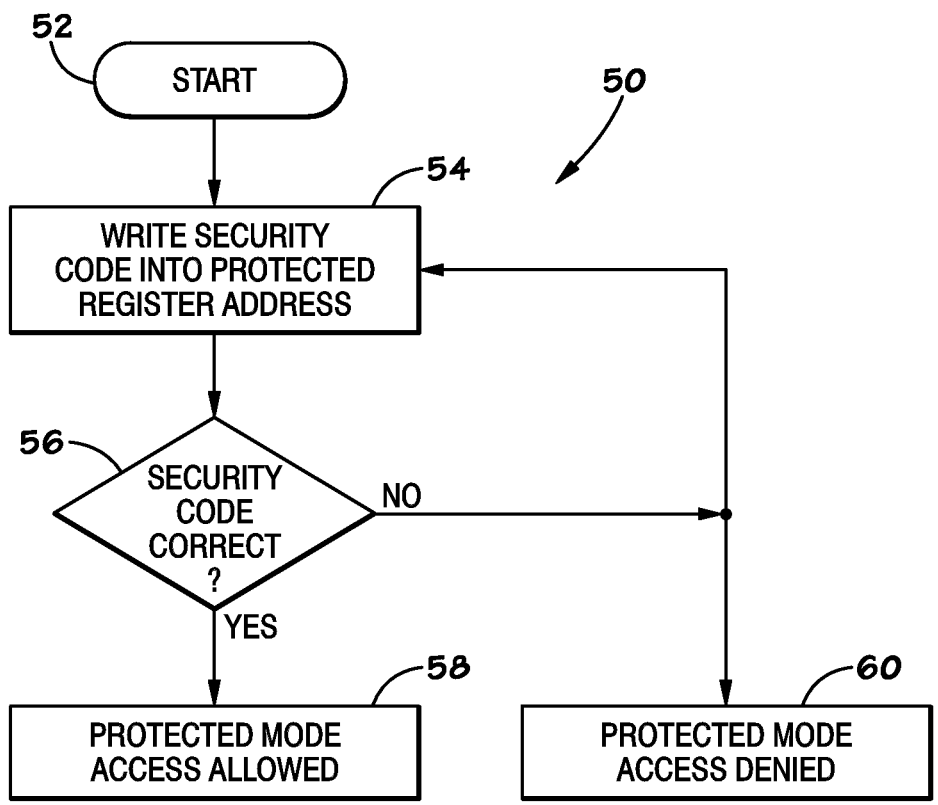
FIG. 3 is a flow chart illustrating a method for controlling access to a protected mode of operation by use of a protected mode access register in accordance with an embodiment of the present invention.

Turning now to FIG. 3, a flowchart illustrating a method 50 for controlling access to a protected mode is illustrated. The method 50 begins at step 52. At step 54, a value representative of a security code is written to the protected mode access register 28. As discussed above, a user must have knowledge of both the existence of the register 28, as well as its address in order to issue a write command to the register 28. At decision step 56, the value written to the register 28 in step 54 is compared with a correct security code value, which may be stored in a separate register or memory, such as an EEPROM. The comparison of the value written to the register 28 with the correct security code value may be performed by any suitable comparison logic capable of comparing the values of two or more registers. By way of example, one or more digital comparators may be included for comparing each bit of the value stored in the protected mode access register 28 to each bit of the correct security code.

Thereafter, if the comparison logic determines that the user-entered value matches the security code value, then access to the protected mode of the NAND memory device 14 is allowed, as shown at step 58. For instance, the comparison logic, upon determining that the user has written the correct security code to the protected mode access register, may enable access to the protected command set 24 and protected registers 26 by sending appropriate signals on corresponding access control lines, which may be similar to control lines 40 in FIG. 1 except being coupled to the protected mode access register 28. Referring back to decision step 56, if the comparison logic determines that the value stored in the register 28 is incorrect (e.g., does not match the stored security code value), access to the protected mode is denied, as illustrated by step 60. However, as indicated by the flowchart of FIG. 3, the user may be permitted to reattempt writing the correct security code value to the register 28, thus returning the method back to step 54.

Further, in alternate embodiments, subsequent attempts to write a security code after initially entering an incorrect code may not be permitted at all or, at the very least, may be restricted to a limited number of attempts (e.g., 3 attempts). If all attempts to enter the security code value are exhausted and unsuccessful, the protected mode register may be locked out and prevented from further write attempts. At this point, additional write commands to the register 28 may be ignored, thus making it impossible for a user to gain access to protected mode even if a subsequent attempt is made to write the correct security code to the register 28. This lock out may remain until the device 14 is power cycled off and back on to reset the write permissions to the protected mode access register 28.

Figure 4:
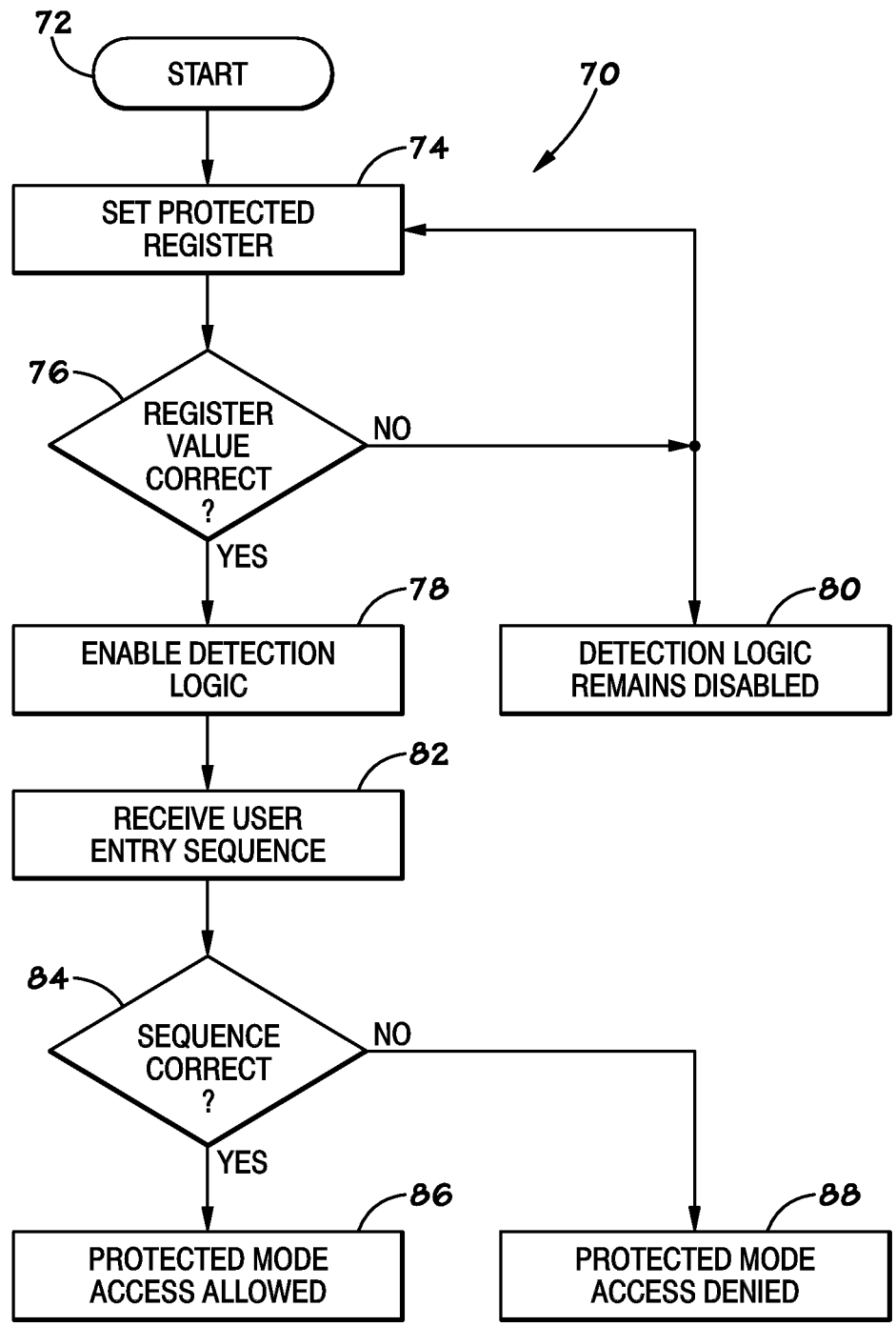
FIG. 4 is a flow chart illustrating a method for controlling access to a protected mode of operation using a protected mode access register in conjunction with entry sequence detection logic in accordance with an embodiment of the present invention.

Turning now to FIG. 4, a flowchart illustrating a second method 70 for controlling access to a protected mode is illustrated. Unlike the method described with reference to FIG. 3, the presently illustrated method 70, which begins at step 72, utilizes both the protected mode access register 28 and the detection logic 32 to control protected mode access in a device, such as the NAND memory device 14 of FIG. 1. In other words, a user must successfully provide the proper credentials (e.g., security code, protected mode entry sequence) with respect to each of the protected mode access register 28 and the detection logic 32 in order to gain access to the protected commands 24 and protected registers 26.

At step 74, a value representative of a security code is written to the protected mode access register 28. Here again, a user must have knowledge of both the existence of the register 28, as well as its address in order to issue a proper write command to write data to the register 28. At decision step 76, the value written to the register 28 in step 74 is compared with a correct security code value by way of suitable comparison logic. If the value written in the protected mode access register 28 is incorrect, the detection logic 32 remains disabled, as illustrated at step 80. Thus, any subsequent attempts to enter a protected mode entry sequence are ignored, even if the subsequently attempted entries are correct. Although the method of FIG. 4 provides the user further attempts to enter a correct security code, as discussed above, alternate embodiments may preclude further attempts completely or may limit the number of additional attempts.

Alternatively, if at the step 76, the comparison logic determines that the code written to the register 28 is correct, then the detection logic 32 may be enabled at step 78. For instance, as discussed above with reference to the embodiment of the memory system 10 illustrated in FIG. 1, the detection logic 32 may be enabled to begin receiving a protected mode entry sequence upon receiving an enable signal (PME_EN) via communication line 36. In other embodiments, an enable bit within the detection logic 32 may be set by a command upon detecting that the correct security code has been written into the protected mode access register 28 (step 76). Once enabled, the detection logic 32 may begin receiving a protected mode entry sequence entered by the user, as depicted at step 82. As discussed above, certain embodiments of the present invention provide, among other things, a highly secure protected mode entry sequence requiring entries on both the input (SIN) and output (SOUT) pins of an SPI NAND interface. Requiring a user to enter commands on both the input and output pins reduces, if not eliminates, the probability that the protected mode entry sequence is entered accidentally through random software data entry.

Figure 5:
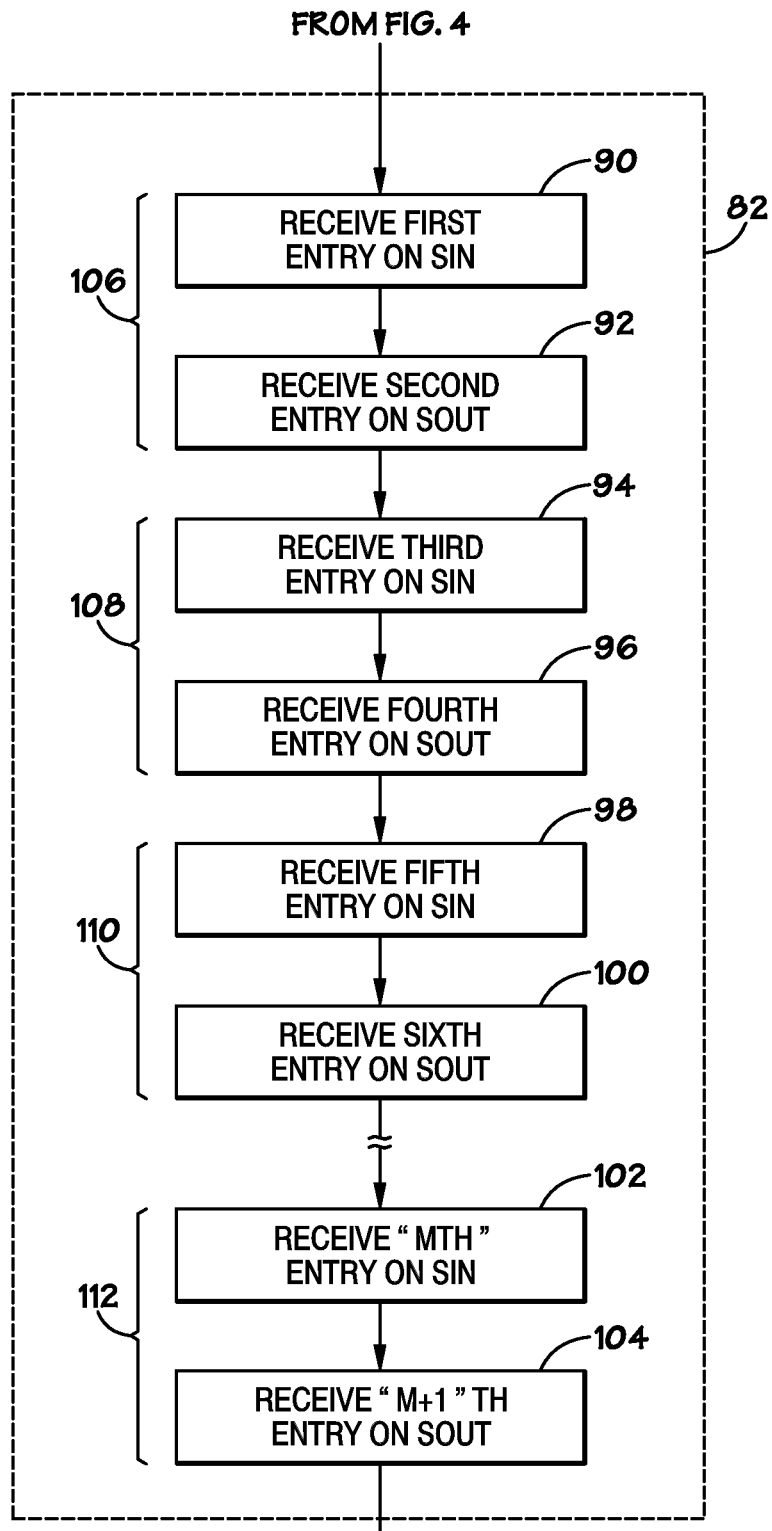
FIG. 5 is a flow chart illustrating a method for receiving an entry sequence on both input and output pins of an SPI NAND interface in accordance with an embodiment of the present invention.

Referring now to FIG. 5, a more detailed flow chart illustrating a method for receiving an entered protected mode entry sequence, as depicted by step 82 of FIG. 4, is illustrated. At step 90, the detection logic 32 may receive a first entry of a protected mode entry sequence on the SIN data line of the SPI NAND interface 18. At step 92, a second entry in the sequence is subsequently received by the SPI NAND interface 18 on the SOUT data line. Thereafter, at step 94, a third entry of the sequence is received on the SIN data line and, at step 96, a fourth entry of the sequence is received on the SOUT data line. In other words, the presently illustrated method provides for alternating the entry sequence inputs between the SIN and SOUT pins. As discussed above, the presently illustrated technique may provide a secure protected mode entry sequence using as little as 4 entries (e.g., steps 90-96). However, depending on the degree of security required, longer entry sequences having more than four entries may also be utilized.

For instance, continuing to steps 98 and 100, the detection logic 32 may receive a fifth entry via the SIN data line and a sixth entry via the SOUT data line, respectively. Indeed, as illustrated in FIG. 5, the detection logic 32 may continue to receive alternating entry sequence inputs on SIN and SOUT until the final SIN and SOUT entries are received. For example, as illustrated by step 102 and 104 of FIG. 5, the final SIN entry input is designated as the "m-th" entry, and the final SOUT entry input is designated as the "m+1th" entry. In this manner, the detection logic 32 may be configured to receive any desired number of "toggled" or alternating protected mode entry sequence input pairs, wherein each input pair includes an input on the SIN pin, followed by an input on the SOUT pin. For instance, the first and second entries (e.g., steps 90, 92) represent a first alternating SIN/SOUT input sequence 106, the third and fourth entries (e.g., steps 94, 96) represent a second alternating SIN/SOUT input sequence 108, and the fifth and sixth entries (e.g., steps 98, 100) represent a third alternating SIN/SOUT input sequence 110. The final alternating SIN/SOUT input sequence (e.g., steps 102, 104) is designated by reference numeral 112.

Although the entry sequence illustrated in FIG. 5 is disclosed as alternating every other input between the SIN and SOUT pins, it should be appreciated that other embodiments may utilize different configurations. By way of example, an alternate embodiment may first require 3 inputs on the input pin before requiring an input on the output pin. Additionally, it should be noted that the actual number of required entries in a given implementation may depend on various factors, such as cost constraints and the level of security required. For example, because a longer protected mode entry sequence may require more complex detection logic circuitry 32, cost constraints may favor a shorter entry sequence. On the other hand, in implementations where security needs are prioritized above cost constraints, a longer entry sequence may be favored to provide a maximum level of security.

Further, it should be noted that the method illustrated in FIG. 5 presumes that the user has entered each of the entry inputs correctly (e.g., each input matches a corresponding expected input of a protected mode entry sequence) in order to more clearly show an entry input scheme which alternates between receiving entries on the SIN and SOUT pins. As will be discussed in further detail below with reference to FIG. 6, the detection logic 32 may include evaluation and decoding circuitry which is configured to detect erroneous inputs, and may prevent a user from entering additional entries if an incorrect input is detected.

Referring now back to FIG. 4, a determination is made at decision step 84 as to whether the received user-entered input sequence from step 82, as illustrated in FIG. 5, is correct. If the user-entered input sequence is correct (e.g., matches the protected mode entry sequence), then access to the protected commands 24 and protected registers 26 is allowed, as indicated at step 86. If at decision step 84, however, the user-entered input sequence is not correct (e.g., does not match the protected mode entry sequence), then access to the protected commands 24 and protected registers 26 is denied at step 88. As discussed above, an incorrectly entered sequence may temporarily lock out access (e.g., until the device is power cycled) to the protected mode, such that even a subsequent correctly entered sequence will not permit a user to access the protected mode. Further, although the step of receiving the user-entered input sequence (step 82) and the step of determining and/or evaluating whether the entered sequence is correct (step 84) are illustrated as separate steps in FIG. 4, as discussed above, the input sequence may actually be evaluated as each input is received. Thus, steps 82 and 84 may actually occur in parallel in certain embodiments.

Figure 6:
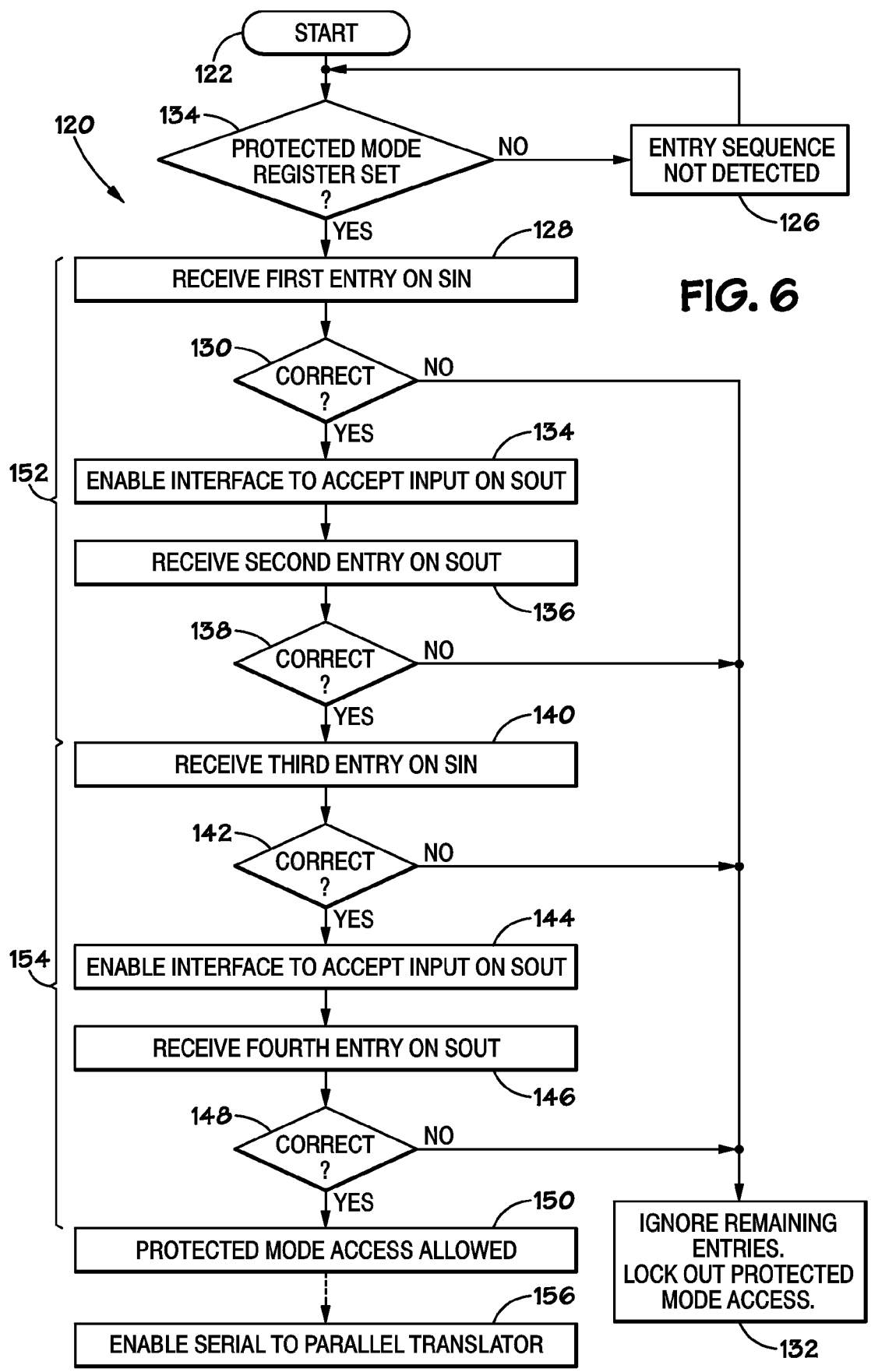
FIG. 6 is a flow chart illustrating a method for detecting and evaluating a protected mode entry sequence on both input and output pins of an SPI NAND interface in accordance with an embodiment of the present invention.

For instance, turning now to FIG. 6, a method 120 depicting the evaluation of a user-entered input sequence by the detection logic 32 is illustrated in accordance with an embodiment of the present invention. Specifically, the method 120 begins at step 122 and illustrates a protected mode entry sequence having a total of 4 entries. As discussed above, the detection logic 32, in certain embodiments, may only be enabled if a correct security code is written to a protected mode access register 28. Thus, at step 124, the value stored in the protected mode access register 28 is evaluated to determine whether or not the stored value matches the correct security code value. If the value stored in the protected mode access register 28 does not match the security code value, then the detection logic 32 remains disabled, as indicated at step 126, such that any user-entered protected mode entry sequence inputs are ignored, regardless of whether the entered input sequence is correct or not. Thus, as indicated by the output arrow of step 126, the method 120 may wait until a correct security code is written to the protect mode access register 28 before enabling the detection logic 32.

Returning to decision step 124, if the data stored in the protected mode access register 28 matches the requisite security code, then the detection logic 32 is enabled to begin detecting and evaluating user-entered inputs. As discussed above, a correct protected mode entry sequence, in accordance with embodiments of the present invention, may require that the input sequence is entered on both input and output pins of the device 14. For instance, beginning at step 128, a first entry is received by the SPI NAND interface 18 on the SIN data line. Next, at decision step 130, the received first entry is compared to the first entry of the protected mode entry sequence. As described above, embodiments of the detection logic 32 may utilize latches, registers, flip-flops, or some appropriate combination thereof to process and compare the received entries with the expected entries. If the received first entry is determined to be incorrect, then the detection logic 32 may be disabled to prevent any subsequent input entries and may be further configured to temporarily lock out the protected mode access (e.g., access to protected commands 24 and protected registers 26). For instance, as discussed above, protected mode access may be disabled by setting the PME_LOCK lock bit to override the security access protocols until at least the next time the device 14 is power cycled off and on. This lock out procedure is illustrated at step 132.

Returning back to decision step 130, if the first entry is determined to be correct, then the detection logic 32 may be configured to enable the SPI NAND interface 18 to accept the next entry on the SOUT pin, as illustrated at step 134. As described above, under normal operations, an input on an output pin is generally interpreted by the device 14 to be an illegal operation and is thus ignored. Accordingly, to enable the receiving of inputs on the SOUT pin, the detection logic may transmit the above-described SOUT_IN_ON enable signal to the SPI NAND interface 18 to temporarily enable the SOUT pin to accept inputs. Once the SOUT pin is enabled to accept an input, a second entry may be received via by the SPI NAND interface 18 on the SOUT data line at step 136. Next, at decision step 138, if the second entry is determined to be incorrect, then the method 120 proceeds to step 132, wherein the detection logic 32 is disabled and protected mode access is temporarily locked out, as described above.

Returning to decision step 138, if the received second entry on SOUT is determined to be correct, then the SPI NAND interface 18 and detection logic 32 may receive and evaluate a third entry via the SIN data line, as illustrated at step 140. Though not explicitly illustrated in the present method, prior to receiving the third entry at step 140, the receiving of inputs on the SOUT pin may be disabled, for example, by transmitting the SOUT_IN_OFF disable signal to the SPI NAND interface 18. Thus, further inputs on the SOUT pin may be prevented until a subsequently entered correct input on the SIN pin is received. At decision step 142, if the third entry is determined to be incorrect, then the method 120 proceeds to step 132 and temporarily locks out protected mode access on the device 14, as discussed above. If, at step 142, the third entry is correct, the detection logic 32 may be configured to enable the SPI NAND interface 18 once again to accept the next entry on the SOUT pin, as illustrated at step 144. As described above, this step may include transmitting an SOUT_IN_ON enable signal to the SPI NAND interface 18 to temporarily enable the SOUT pin to accept inputs. Once the SOUT pin is enabled to accept an input, a fourth entry may be received via by the SPI NAND interface 18 on the SOUT data line, as illustrated at step 146. At decision step 148, if the fourth entry is determined to be incorrect, then the method 120 proceeds to step 132, wherein the detection logic 32 is disabled and protected mode access is temporarily locked out, as described above. However, if the fourth entry is correct at step 148, then the detection logic 32 determines that all four entries of the presently illustrated protected mode entry sequence have been entered correctly, thereby permitting access to the protected mode or modes of operation and allowing a user to access the protected commands 24 and protected registers 26.

As illustrated in the method 120, the protected mode entry sequence includes four entries which are required to be alternatingly entered on the SIN and SOUT pins of the SPI NAND interface 18. Specifically, a first pair 152 of alternating SIN/SOUT inputs consists of the first and second entry inputs (steps 128, 136), and a second pair 154 of alternating SIN/SOUT inputs consists of the third and fourth entry inputs (steps 140, 146). As one skilled in the art will appreciate, the method 120 of FIG. 6 is merely intended to illustrate one possible implementation of the present invention. It should be noted that other embodiments of the present invention need not be limited to the present example and may utilize longer or shorter entry sequences depending on specific design goals or constraints.

Further, as discussed above with regard to FIG. 2, certain embodiments of the present invention may include a parallel interface NAND memory array 20' as well as a serial-to-parallel NAND translator 42, to facilitate the translation of serial commands provided to the NAND memory device 14 through the SPI bus 16 into a format compatible and recognizable by the parallel interface NAND memory array 20'. Thus, in embodiments including a parallel interface NAND memory array 20', the method 120 may include the additional step of enabling a serial-to-parallel NAND translator 42, as illustrated at step 156. As described above, this step may include transmitting an enable signal (SPT_EN) from the detection logic 32 (e.g., via control line 38) to the SPI NAND interface 18 for enabling the serial-to-parallel NAND translator 42.

Figure 7:
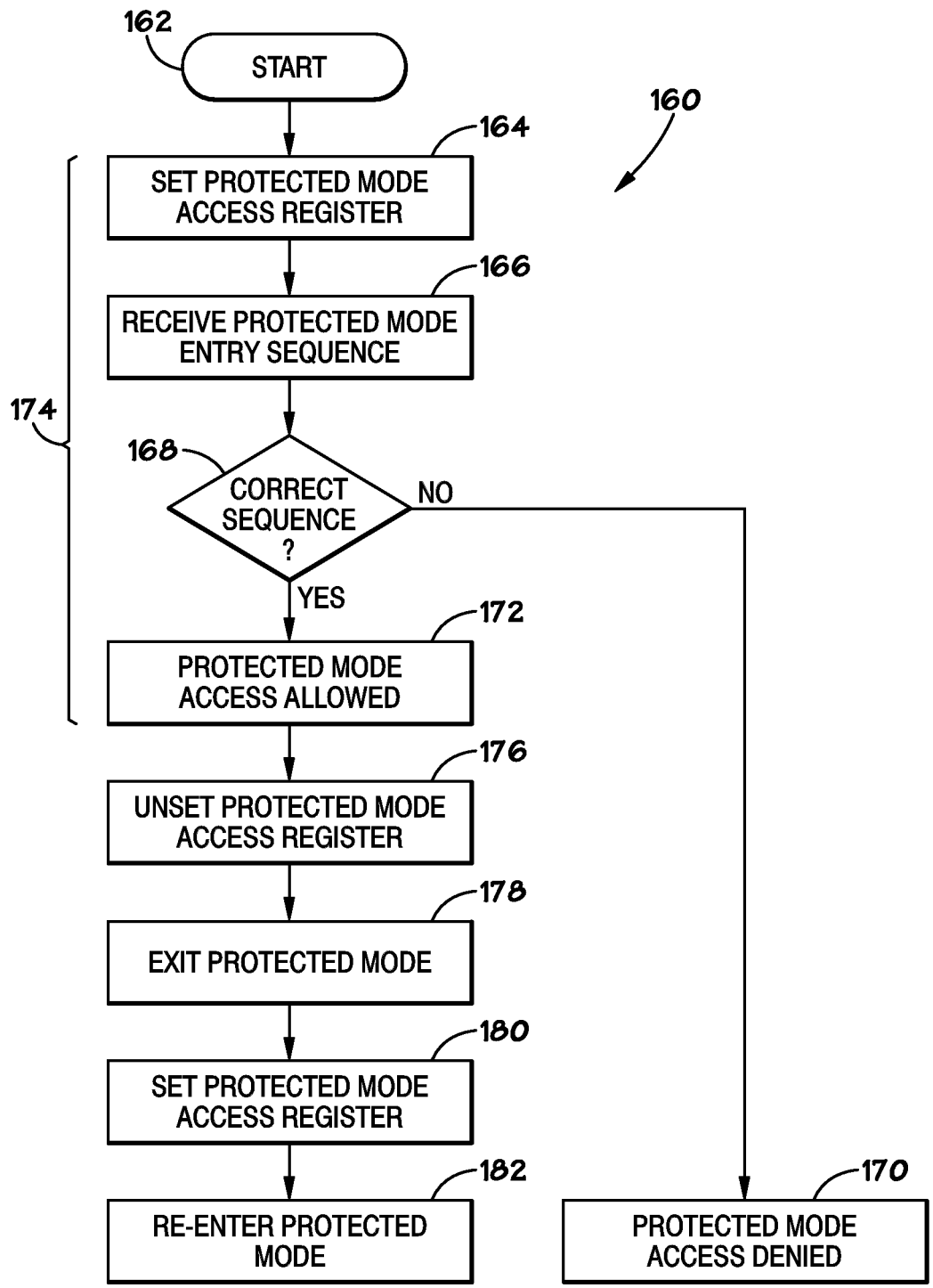
FIG. 7 is a flow chart illustrating a method for, after protected mode access has been allowed, exiting and re-entering protected mode using only a protected mode access register without requiring that a protected mode entry sequence be entered again in accordance with an embodiment of the present invention.

Continuing now to FIG. 7, a further feature of the NAND memory device 14 is illustrated in accordance with an embodiment of the present invention. Specifically, FIG. 7 illustrates a method 160 for using the protected mode access register 28 of FIG. 1 to quickly exit and re-enter the protected mode or modes of operation after the protected mode entry sequence has already been correctly entered. The method 160 begins at step 162. At step 164, the correct security code value is written to the protected mode access register 28. This enables the detection logic 32 to begin receiving the protected mode entry sequence, as illustrated at step 166. At decision step 168, if the entered sequence is determined by the detection logic 32 to be incorrect, then protected mode access is denied at step 170. As discussed above, the detection of an incorrectly entered sequence may temporarily lock out access to the protected mode, including access to the protected commands 24 and protected registers 26. Alternatively, if the detection logic 32 determines at decision step 168 that the sequence received at step 166 is correct protected mode access is granted, as illustrated at step 172. Thus, the steps 164, 166, 168, and 172, collectively referred to by the reference number 174, essentially summarize the method illustrated in FIG. 3.

The subsequent steps of the method 160 illustrated the use of the protected mode access register 28 to quickly exit and re-enter the protected mode without requiring a user to re-input the protected entry sequence. As discussed in the embodiments illustrated above, access to the protected mode or modes essentially requires (1) the protected mode access registers store a correct security code, and (2) a correctly entered protected mode entry sequence. The illustrated method 160 essentially provides a mechanism allowing the device 14 to "remember" whether or not a correct entry sequence has been received. For instance, this may be accomplished by configuring the detection logic 32 to set an access acknowledgment bit once a correctly entered sequence has been detected. Thus, once the correct entry sequence has been entered once, the second of the two requirements for accessing protected mode is satisfied and, thereafter, protected mode access may be "toggled" on and off by altering the value of the protected mode access register 28 between the correct security code value and an incorrect value. Accordingly, this provides a user who has previously entered the correct entry sequence a convenient mechanism for quickly entering and exiting protected mode without having to re-enter protected mode entry sequence each time.

For instance, continuing to step 176, the protected mode access register 28, which currently stores the correct security code value from step 164, may be "unset" such that the correct security code value is no longer stored in the register 28. For instance, this may be accomplished simply by writing any value to the protected mode access register 28 which is not equivalent to the security code value. Thereafter, once the protected mode access register 28 is unset, protected mode access to the device 14 is disabled. Thus, the user has essentially "exited" the protected mode at step 178.

Thereafter, if a user desires to re-enter or re-access the protected mode, the user may do so simply by writing the correct security code to the protected mode access register 28 once again, as illustrated at step 180. Because the above-described access acknowledgment bit is set, the device 14 "remembers" that the correct protected mode entry sequence has been previously entered and, therefore, protected mode access is allowed, as indicated at step 182, without requiring a user to re-enter the entry sequence. Thus, a user may quickly exit and re-enter protected mode without having to re-enter the entry sequence as long as the access acknowledgment bit indicates that the sequence was previously entered correctly. For instance, this feature may remain until the access acknowledgment bit is unset or reinitialized, such as by power cycling the device 14 off and on.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for detecting a protected mode entry sequence comprising:
   receiving a first plurality of inputs on a first interface pin of a device and a second plurality of inputs on a second interface pin of the device, wherein the first interface pin normally operates as an input pin of the device and the second interface pin normally operates as an output pin of the device;
   comparing each of the received inputs of the first and second pluralities of inputs to a corresponding expected input of the protected mode entry sequence; and
   allowing access to a protected mode of operation only if each of the received inputs of the first and second pluralities of inputs matches a respective corresponding expected input of the protected mode entry sequence or else, denying access to the protected mode, wherein the protected mode is a debug mode, a settings programming mode, or a testing or evaluation mode, or a combination thereof.

2. The method of claim 1, wherein receiving the first and second pluralities of inputs comprises alternatingly receiving one or more of the first plurality of inputs on the input pin and subsequently receiving one or more of the second plurality of inputs on the output pin.

3. The method of claim 2, wherein the one or more of the second plurality of inputs is received on the output pin only if the one or more of the first plurality of inputs received on the input pin matches a corresponding expected one or more inputs of the protected mode entry sequence.

4. The method of claim 1, wherein comparing each of the received inputs of the first and second pluralities of inputs to a corresponding expected input is permitted only if a security code is first provided.

5. The method of claim 4, wherein providing the security code comprises writing the security code to a register.

6. The method of claim 1, wherein comparing each of the received inputs of the first and second pluralities of inputs to a corresponding expected input is permitted only if a command configured to enable the comparison is first executed.

7. The method of claim 1, wherein the interface is a serial peripheral interface (SPI) NAND interface, the input pin is a serial data in (SIN) pin, and the output pin is a serial data out (SOUT) pin, and wherein the SPI NAND interface is coupled to a NAND memory array.

8. The method of claim 7, wherein the NAND memory array comprises a parallel interface NAND memory array.

9. The method of claim 8, further comprising enabling a serial-to-parallel NAND translator configured to convert SPI NAND signals received on the SPI NAND interface into parallel NAND signals, the serial-to-parallel NAND translator being enabled only if access to the protected mode is first allowed.

10. A method for controlling protected mode access in an electronic device, the method comprising:
    receiving a first code;
    storing the first code in a protected mode access register;
    comparing the first code to a security code; and
    when the first code matches the security code, attempting to detect a protected mode entry sequence, wherein attempting to detect the protected mode entry sequence comprises:

receiving a plurality of inputs, each input of the plurality of inputs being received on one of two or more input pins of an interface of the memory device;

comparing each of the received plurality of inputs to a corresponding expected input of the protected mode entry sequence; and allowing protected mode access to the electronic device only if each of the received plurality of inputs matches a corresponding expected input of the protected mode entry sequence;

wherein a first number of the plurality of inputs is received on an input pin of the interface and wherein a second number of the plurality of inputs is received on an output pin of the interface.

11. The method of claim 10, wherein receiving and comparing the plurality of inputs comprises:

(a) receiving on the input pin one of the first number of the plurality of inputs;

(b) comparing the one of the first number of the plurality of inputs to its corresponding expected input of the protected mode entry sequence;

(c) enabling the output pin to accept a subsequent input only if the one of the first number of inputs received on the input pin matches its corresponding expected input;

(d) receiving on the output pin one of the second number of the plurality of inputs;

(e) comparing the one of the second number of the plurality of inputs input to its corresponding expected input of the protected mode entry sequence;

(f) if the input received on the output pin matches its corresponding expected input, disabling the output pin to accept a further input; and (g) repeating steps (a)-(f) until each of first number and second number of the plurality of inputs has been received and compared with a corresponding expected input of the protected mode entry sequence.

12. The method of claim 10, further comprising, if any of the received first or second numbers of the plurality of inputs does not match its corresponding expected input of the protected mode entry sequence, locking out protected mode access in the memory device, wherein locking out protected mode access prevents the detection of a protected mode entry sequence.

13. The method of claim 10, further comprising, if each of the received plurality of inputs matches a respective corresponding expected input of the protected mode entry sequence, setting an acknowledgment bit indicating that the protected mode entry sequence has been correctly entered.

14. The method of claim 13, further comprising:
receiving a second code, wherein the second code does not match the security code;
storing the second code in the protected mode access register; and
disabling protected mode access.

15. The method of claim 14, further comprising:
receiving a third code, wherein the third code matches the security code;
storing the third code in the protected mode access register;
checking the acknowledgment bit to determine whether the protected mode entry sequence was previously entered correctly; and
re-enabling protected mode access without requiring the protected mode entry sequence to be re-entered if the acknowledgement bit indicates that the protected mode entry sequence was previously entered correctly.

16. A memory device comprising:
a NAND memory array;
an interface including an input pin and an output pin, the interface being configured to receive a plurality of inputs comprising a first plurality of inputs to be input to the input pin and a second plurality of inputs to be input to the output pin; and
detection circuitry configured to detect a protected mode entry sequence by comparing each of the received plurality of inputs to a respective corresponding expected input of the protected mode entry sequence, wherein the detection circuitry is further configured to allow access to a protected mode of operation not typically accessible to an end-user on the memory device only if it is determined that each of the received plurality of inputs matches its respective corresponding expected input.

17. The memory device of claim 16, wherein the detection circuitry is configured to temporarily enable the output pin to receive the second plurality of inputs only while the detection circuitry is attempting to detect the protected mode entry sequence.

18. The memory device of claim 17, wherein the interface is configured to alternate between receiving one of the first number of the plurality of inputs on the input pin and one of the second number of the plurality of inputs on the output pin, and wherein the detection circuitry is configured to enable the output pin to accept an input only if an immediately preceding input received on the input pin matches its corresponding expected input of the protected mode entry sequence.

19. The memory device of claim 16, wherein the protected mode of operation comprises a debug mode, a settings programming mode, or a testing or evaluation mode, or a combination thereof.

20. The memory device of claim 16, wherein the interface is a serial peripheral interface (SPI) NAND interface, the input pin is an SIN pin, and the output pin is an SOUT pin.

21. The memory device of claim 20, wherein the NAND memory array comprises a parallel interface NAND memory array.

22. The memory device of claim 21, further comprising a serial-to-parallel NAND translator configured to convert serial NAND signals received on the SPI NAND interface into parallel NAND signals, wherein the serial-to-parallel NAND translator is enabled only if access to the protected mode is first allowed.

23. A NAND memory device comprising:
a NAND memory array;
a serial peripheral interface (SPI) NAND interface configured to receive a first number of a plurality of inputs on an SIN pin and a second number of the plurality of inputs on an SOUT pin, the SPI NAND interface being coupled to the NAND memory array;
a protected mode access register, the protected mode access register being operatively coupled to store data received via the SPI NAND interface;
detection circuitry coupled to the SPI NAND interface, wherein the detection logic is configured to detect a protected mode entry sequence by comparing each of the received plurality of inputs to a respective corresponding expected input of the protected mode entry sequence, wherein the detection circuitry is configured to be enabled only if a security code is first written to the protected mode access register, and wherein the detection circuitry is configured to permit the SOUT pin to receive the second number of the plurality of inputs only while attempting to detect the protected mode entry sequence; and at least one of a protected command set or a protected register set not typically accessible to an end-user coupled to the detection circuitry via one or more access control lines;

wherein the memory device is configured such that access to the protected command or protected register sets are allowed only if each of the received plurality of inputs matches a respective corresponding expected input of the protected mode entry sequence.

24. The device of claim 23, wherein the NAND memory array is a parallel interface NAND memory array.

25. The device of claim 24, further comprising a serial-to-parallel NAND translator configured to convert serial NAND signals received on the SPI NAND interface into a parallel NAND signals, wherein the serial-to-parallel NAND translator is configured to be enabled only if access to the protected command set or the protected register set is first allowed.

* * * * *

UNITED STATES PATENT AND TRADEMARK OFFICE
CERTIFICATE OF CORRECTION

PATENT NO. : 8,549,246 B2
APPLICATION NO. : 12/112880
DATED : October 1, 2013
INVENTOR(S) : Theodore T. Pekny et al.

Page 1 of 1

It is certified that error appears in the above-identified patent and that said Letters Patent is hereby corrected as shown below:

In the Claims

In column 17, line 29, in Claim 11, after "inputs" delete "input".

Signed and Sealed this
Twenty-eighth Day of January, 2014

Michelle K. Lee
*Deputy Director of the United States Patent and Trademark Office*